Oct. 3, 1939.    F. ELLER    2,174,571
CASH REGISTER
Filed March 12, 1935    6 Sheets-Sheet 2

INVENTOR
Fritz Eller
By Frank Reichow
ATTORNEY

Oct. 3, 1939.  F. ELLER  2,174,571

CASH REGISTER

Filed March 12, 1935   6 Sheets-Sheet 3

INVENTOR
Fritz Eller
By Franz Reinhold
ATTORNEY

Oct. 3, 1939.   F. ELLER   2,174,571
CASH REGISTER
Filed March 12, 1935   6 Sheets-Sheet 4
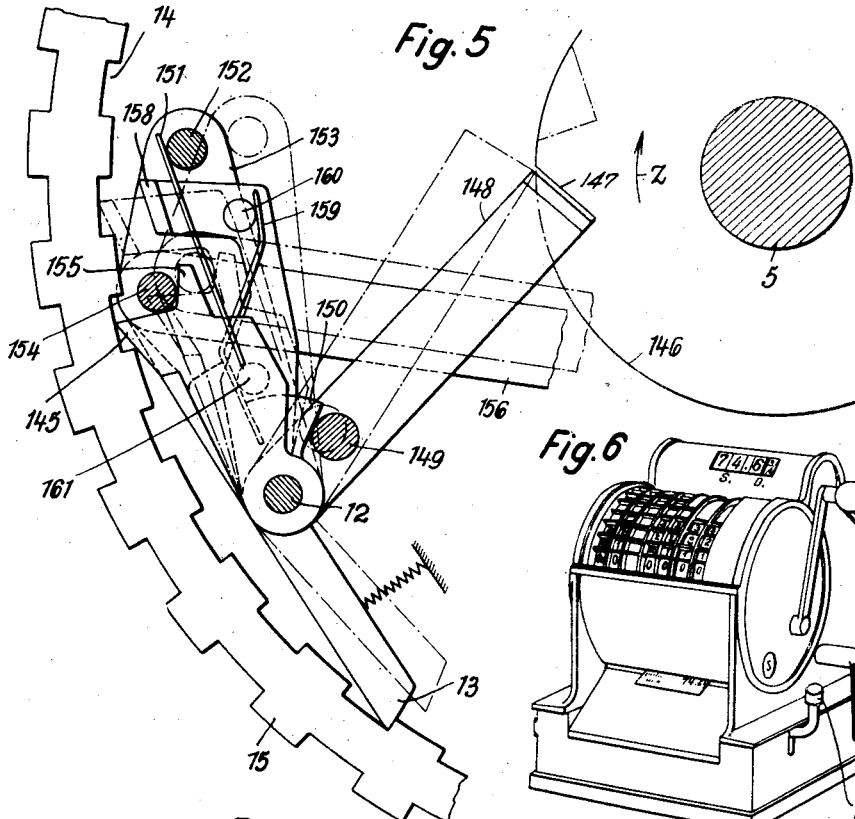
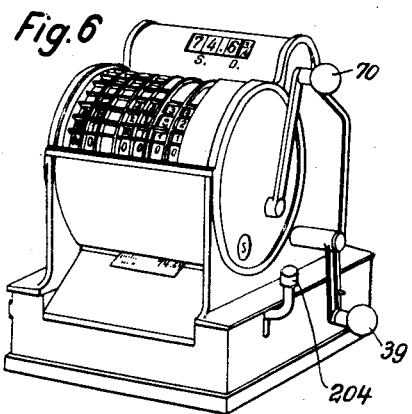

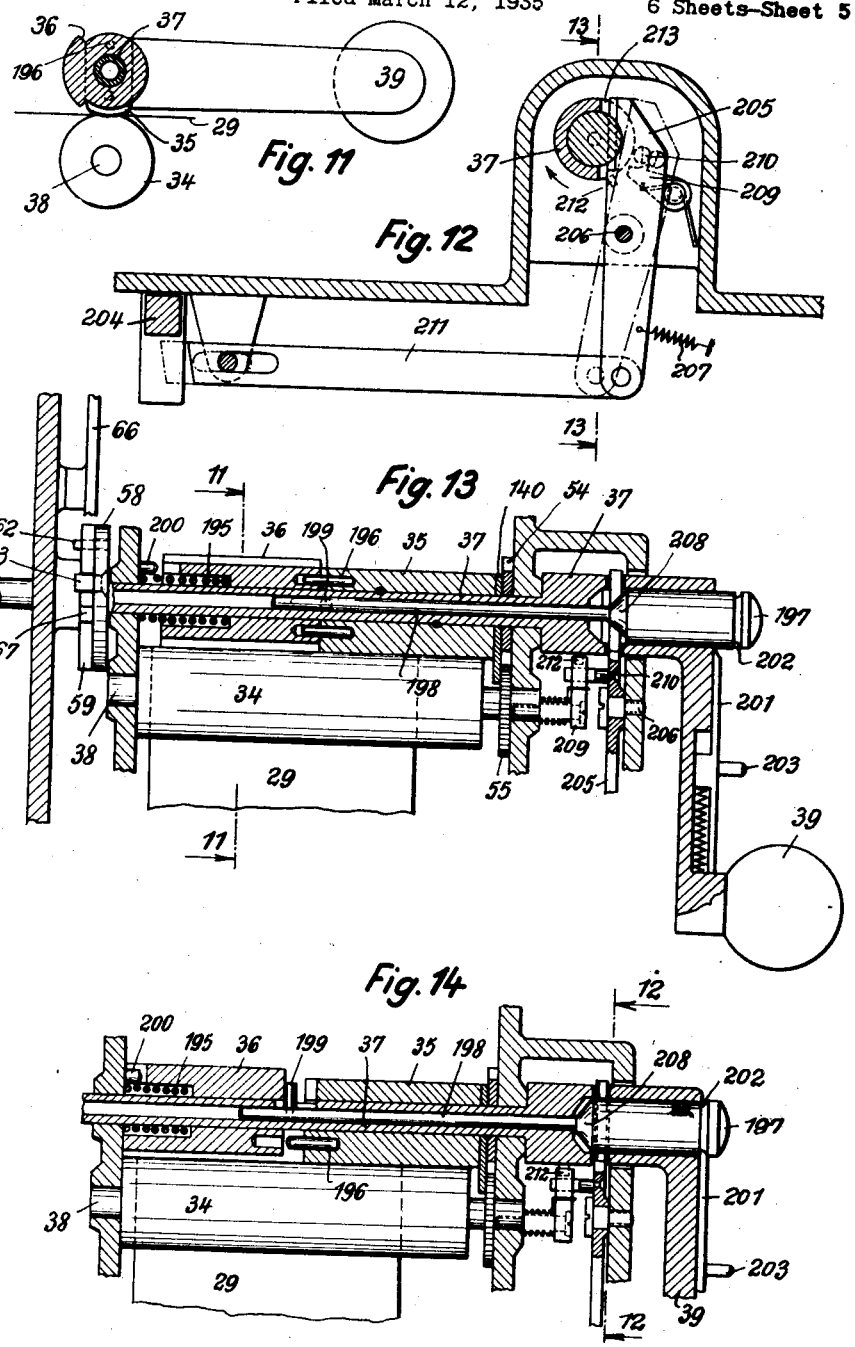

Oct. 3, 1939.  F. ELLER  2,174,571
CASH REGISTER
Filed March 12, 1935  6 Sheets-Sheet 6
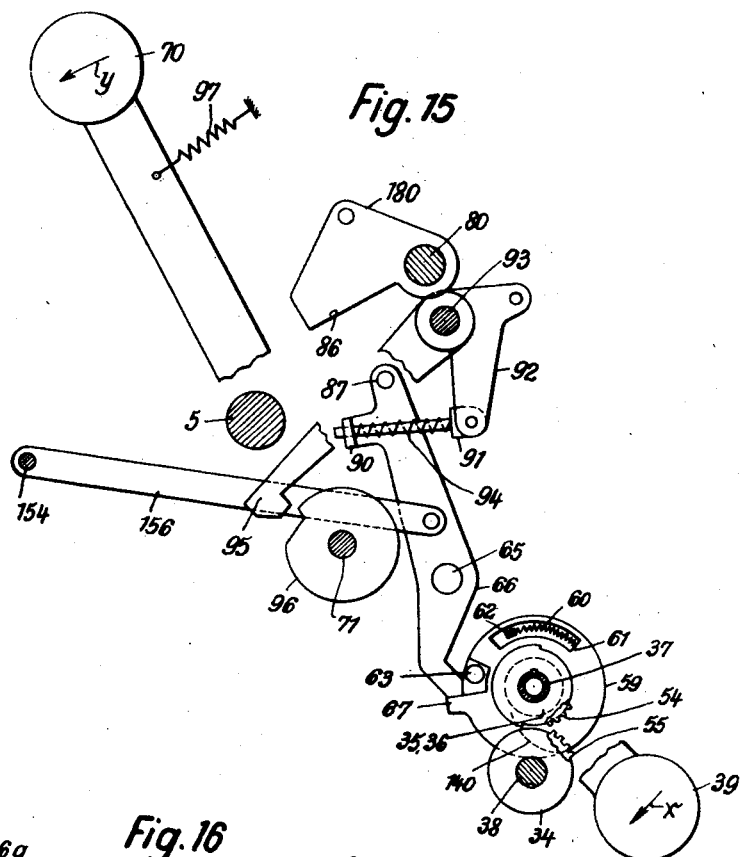
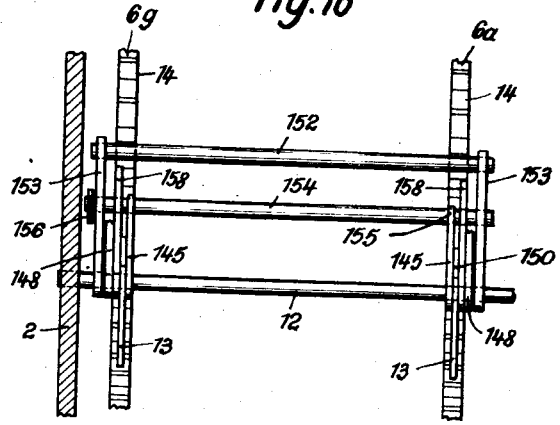
INVENTOR
Fritz Eller
By Frank Reichead
ATTORNEY Patented Oct. 3, 1939

2,174,571

UNITED STATES PATENT OFFICE 2,174,571

CASH REGISTER

Fritz Eller, Berlin-Wannsee, Germany

Application March 12, 1935, Serial No. 10,687
In Germany August 10, 1933

8 Claims. (Cl. 235—3)

My invention relates to improvements in cash registers, and more particularly in cash registers of the type comprising finger-operated disks, cancelling mechanism, adding mechanism and printing mechanism. By means of the cash register various operations are performed: The values are set by means of the setting disks, they are printed by means of the printing mechanism, and further, they are transmitted to the adding mechanism, and finally the values set by means of the setting mechanism must be cancelled. One of the objects of the improvements is to provide a cash register of the class indicated in which locking means are provided for the said mechanisms, the said locking means being operated so that the correct sequence of the operations is insured and erroneous registrations are avoided.

Thus provision is made for insuring the cancelling of the values set by means of the setting disks after printing and before a new value is set by means of the setting disks and printed by means of the printing mechanism. For this purpose the printing mechanism is provided with locking means which are operatively connected with the cancelling mechanism and which are thrown out of locking position after the cancelling mechanism has been operated for cancelling the values previously set by means of the setting disks, and preferably when the said cancelling mechanism returns into normal position.

Another object of the improvements is to provide locking means for the setting disks and the cancelling mechanism which are constructed so that it is impossible to move the setting disks without each time operating the printing mechanism. This is important because the adding mechanism is operated by the setting disks. Other objects of the improvements will appear from the following description.

Figure 1:
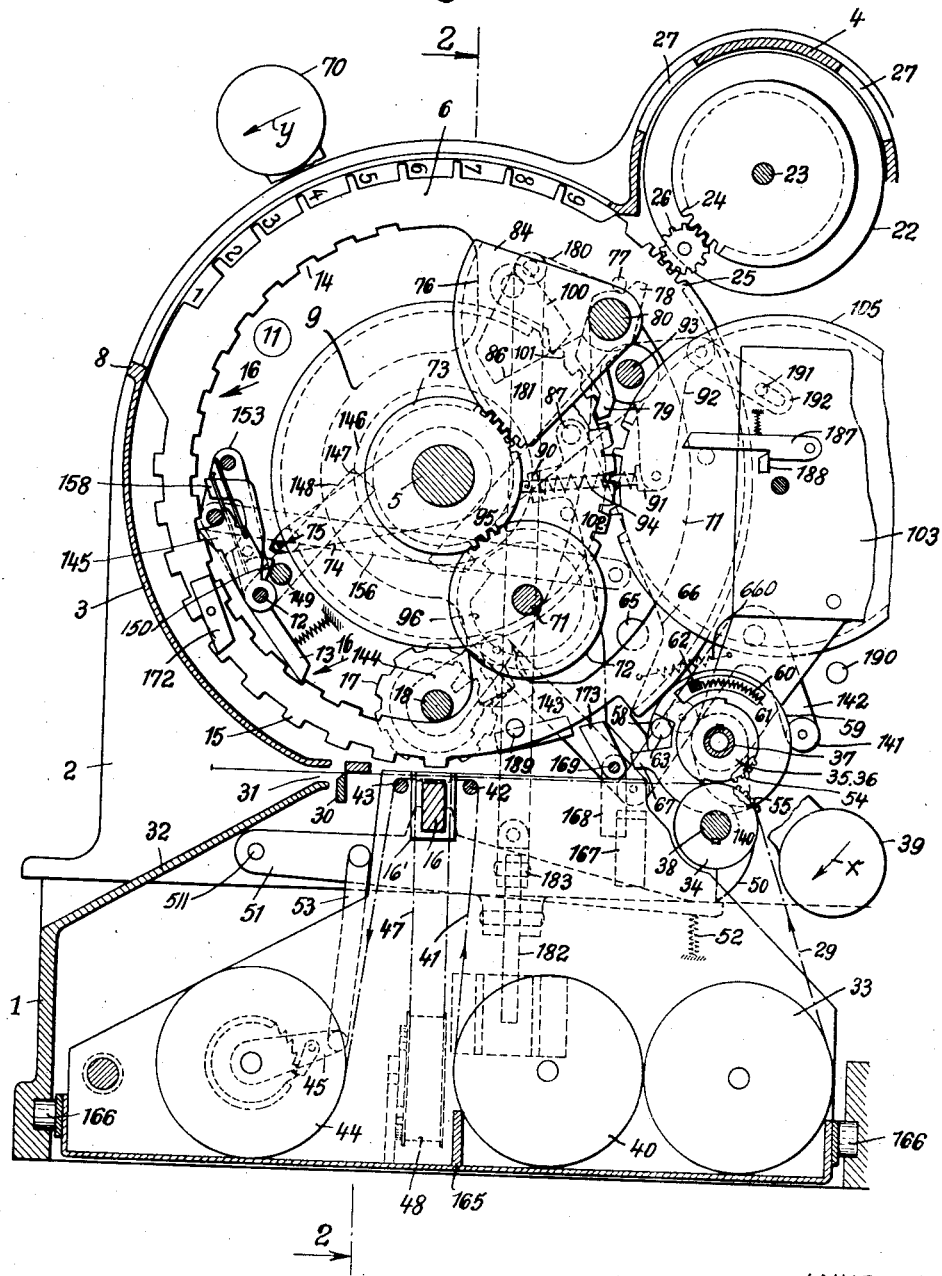
Figure 2:
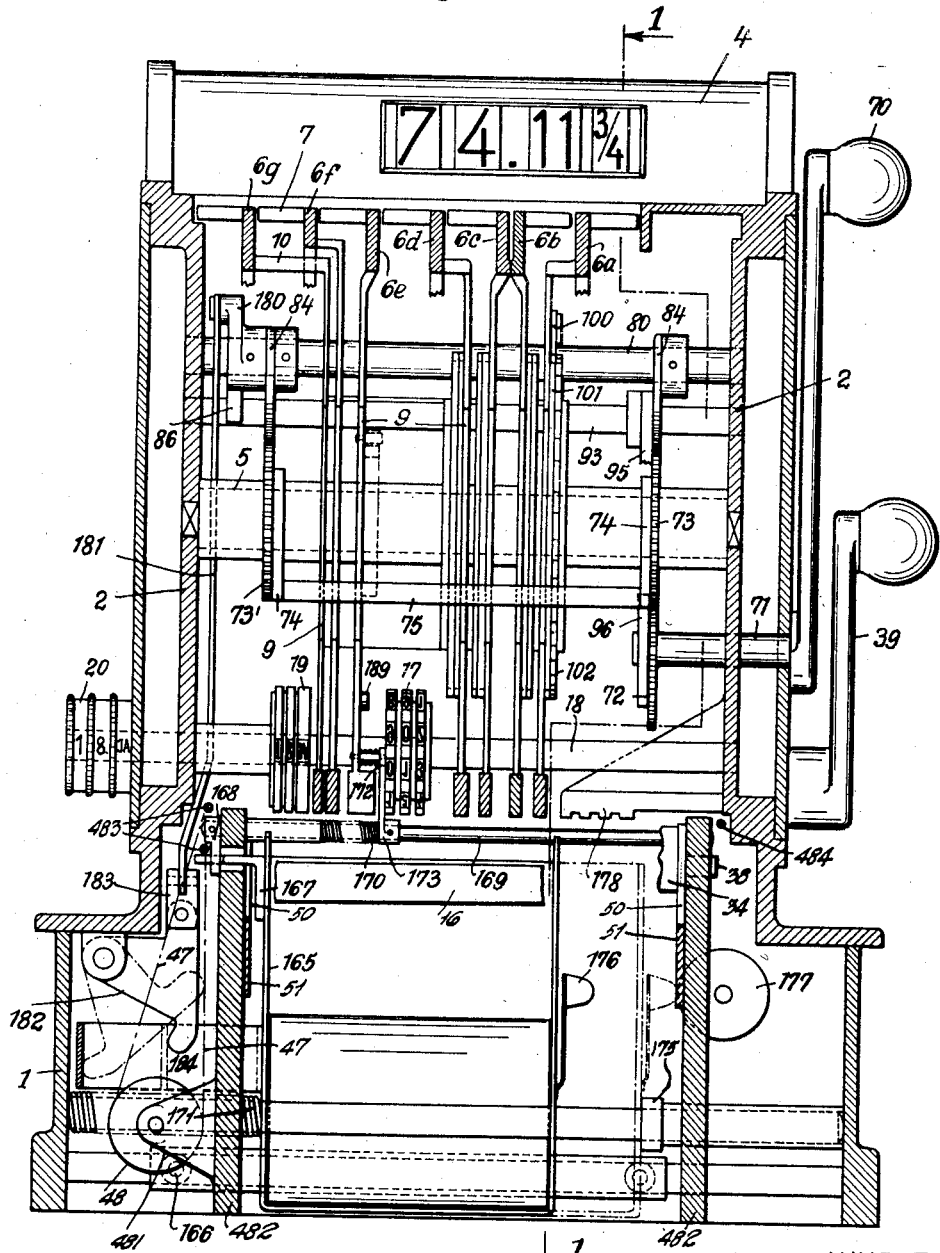
Figure 3:
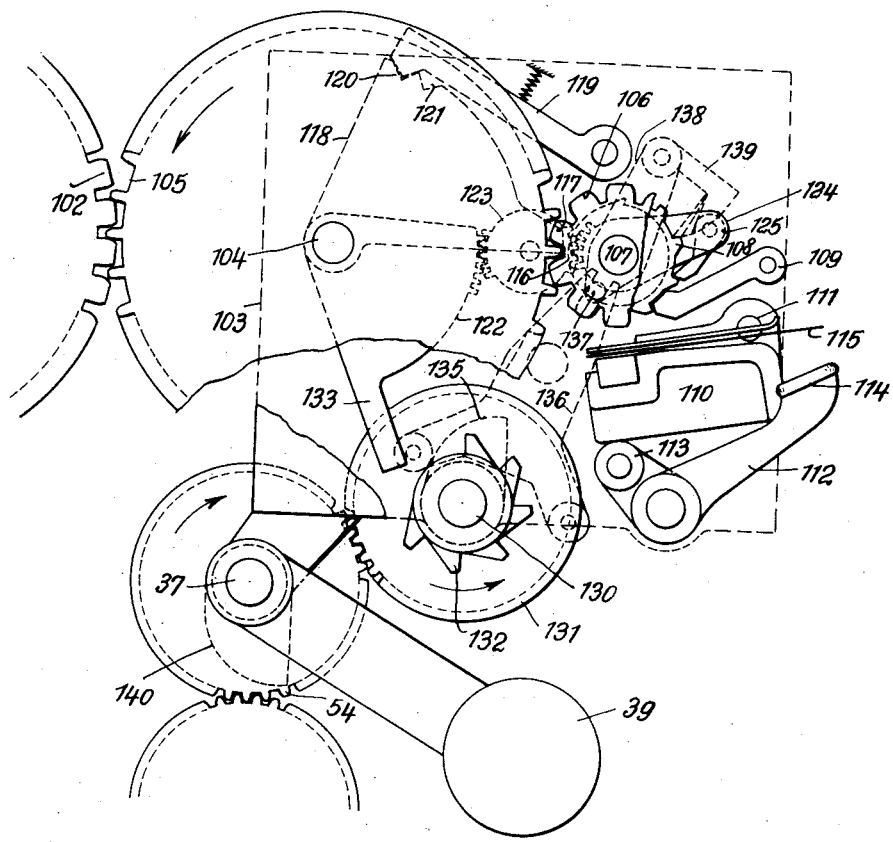
Figure 4:
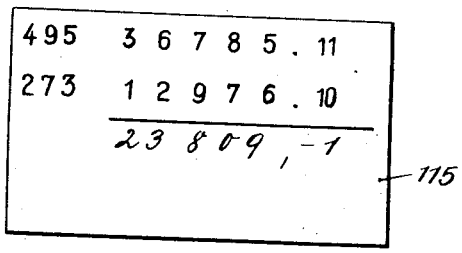
Figure 17:
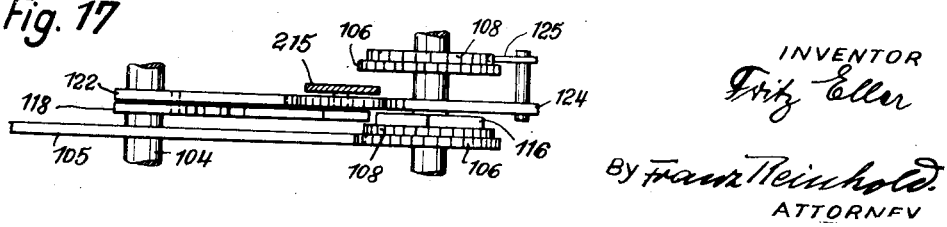

For the purpose of explaining the invention an example embodying the same has been shown in the accompanying drawings in which the same reference characters have been used in all the views to indicate corresponding parts. In said drawings, Fig. 1 is a sectional elevation of the cash register, Fig. 2 is a sectional elevation taken on the line 2—2 of Fig. 1, Fig. 3 is an elevation on an enlarged scale showing the adding mechanism, one of the side walls of the said mechanism being partly broken away, Fig. 4 shows a balance statement printed off from the adding mechanism, Fig. 5 is an elevation on an enlarged scale showing the locking means for the setting register, Fig. 6 is a perspective view of the cash register, Figs. 7 to 9 show examples of vouchers issued from the register, Fig. 10 shows a section from the record strip, Fig. 11 is an elevation partly in section showing the rollers for feeding the strip of paper from which the vouchers are cut, Fig. 12 is a sectional elevation showing the mechanism controlled by the shaft of the printing mechanism for locking the voucher cutting blade in position, Fig. 13 is a sectional elevation taken on the line 13—13 of Fig. 12 and showing the feeding rollers in position for feeding the paper strip a distance corresponding to the size of a voucher, Fig. 14 is a similar sectional elevation showing the said rollers in position for feeding the strip of paper a distance corresponding to the distance between two consecutive lines to permit printing of several items on the voucher, Fig. 15 is an elevation showing in connection with Fig. 5, the locking means for the setting disks, the printing mechanism and the cancelling mechanism, Fig. 16 is an elevation viewed in the direction of the arrows 16—16 of Fig. 1, and Fig. 17 is a top plan view of a part of Fig. 3.

In the example shown in the figures the cash register comprises a base 1 and a top part comprising side walls 2 (that constitute supporting means), a curved front wall 3 and a portion 4 including the indicating device. On a spindle 5 secured to the side walls 2 setting disks 6, severally designated 6a, 6b, 6c, 6d, 6e, 6f, 6g are mounted which are provided each with laterally directed fingers 7 adapted to be engaged by the finger of the operator for setting the same. At the front part of the machine a stop ledge 8 is provided on the front wall 3 which is adapted to be engaged by the finger turning a setting disk 6 forwardly, for limiting the movement thereof. The disks comprise the annular portions indicated in Figs. 1 and 2 6a, 6b, 6c, 6d, 6e, 6f, 6g and central portions 9 formed with cranked arms 10 carrying the said annular portions. Thus between the annular and central portions cut-out intervals 11 are provided through which certain rods and shafts are passed transversely of the machine. On a spindle 12 fixed to the side walls 2 spring-pressed latches 13 are mounted which are adapted to engage notches 14 formed internally on the annular portions 6a, 6b, 6c, 6d, 6e, 6f, 6g for locking the setting disks in the positions to which they have been set by the finger of the operator. Each disk is provided circumferentially with a succession of legends, and it will be understood that each disk carries a corresponding number of fingers 7, one for each legend. In the construction shown in the figures four setting disks 6a, 6b, 6c, 6d are equipped with legends in the nature of the figures from 1 to 9, and these disks are connected with the adding mechanism to be described hereinafter. The next disk 6e is provided with legends in the nature of a series of signs indicating the goods to be sold such as "gas", indicating gasoline, "oil", etc., as appears from Fig. 10. The next disks 6f and 6g are provided with figures indicating the amount of the goods sold. At their bottom parts the disks are formed with successions of type faces 15 corresponding to the aforesaid legends and adapted to print such corresponding legends on strips of paper by means of a printing hammer 16. Between the disks 6d and 6e type disks 17 are mounted on a shaft 18 fixed to the side walls 2, and the said disks are provided with type for printing consecutive numbers on the strips of paper, and they are provided with means for automatically advancing the same. Such mechanisms for printing consecutive numbers are known in the art and I deem it not necessary to describe the same in detail. At the left of the setting disk 6g type wheels 19 are provided which are adapted to print the date on the strips of paper, and which are set in position by means of disks 20 located at the outside of the machine.

In the portion 4 of the casing an indicating device is located which comprises disks 22 mounted on a spindle 23 and connected with gear wheels 24, the said gear wheels being connected with teeth 25 formed on the setting disks by means of pinions 26. The wall of the portion 4 of the casing is provided with peep holes 27 through which the indications appearing on the disks 22 may be read by the clerk and the customer.

Further, the machine comprises an adding mechanism connected with the setting disks. This adding mechanism is shown in detail in Fig. 3, and it will be described hereinafter.

The types 15 are printed on a strip of paper 29 from which the vouchers are cut by means of a cutting device of known construction represented in Fig. 1 in a diagrammatical way by a blade 30, the vouchers being delivered through a slot 31 and on an inclined portion 32 of the base 1. The strip of paper is taken from a spool 33 and passed between a pair of feed rollers 34 and 35, 36 shown in detail in Figs. 11, 13 and 14. By the said rollers the strip is passed between the types 15 which have been set in printing position and the hammer 16. The rollers 35 and 36 are secured to shafts 37 and 38, and to the shaft 37 a hand-operated crank 39 is secured. From a spool 40 a strip of paper 41 is taken which is trained on guide rods 42 and 43 and wound on a spool 44 by pawl and ratchet mechanism 45, the said strip of paper being likewise passed between the types 15 and the hammer 16. An endless inking ribbon 47 is wound on a roller 48 and passed in the form of a loop between the types 15 and the hammer 16, the upper branch of the said loop being located between the strip of paper 29 and the said types, and the lower branch between the said strip of paper 29 and the strip 41. The said roller 48 is mounted on a bracket 481 mounted on one of a pair of cheeks 482 forming parts of the frame 1, and the inking ribbon 47 is guided on rods 483 and 484 secured to the frame 1. Suitable mechanism is provided for intermittently advancing the roller 48 and the inking ribbon 47 trained thereon.

On the shaft 38 a cam disk 50 is mounted which is adapted to act on a pair of printing levers 51 carrying the hammer 16, a spring 52 being provided for throwing the lever 51 and the hammer 16 carried thereby upwardly for printing. The levers 51 are mounted on pivot bolts 511 secured to the side walls of the casing 1. The pawl and ratchet mechanism 45 is operated from the lever 51 by means of a link 53. The shafts 37 and 38 are connected with each other by gear wheels 54 and 55.

To the shaft 37 a disk 58 is secured, and at the side of the said disk a disk 59 is loosely mounted on the said shaft. A spring 60 located between a shoulder 61 formed on the disk 59 and a lug 62 fixed to the disk 58 tends to turn the disk 59 relatively to the disk 58 in clockwise direction (as seen in Figs. 1 and 15), and a pin 63 secured to the disk 58 and engaging in a cut-out portion of the disk 59 permits slight rotary movement of the disk 59 relative to disk 58. On a pivot bolt 65 secured to the side wall of the machine casing a latch 66 is mounted which impelled by the spring 660, is adapted for locking engagement with a nose 67 formed on the disk 59. Thus the latch 66 is adapted to prevent rotary movement of the crank 39 in the direction of the arrow $x$ and consequent operation of the printing mechanism. If the latch 66 is turned against spring tension clockwise (Figs. 1 and 15) for disengaging the nose 67 the disk 59 is by the tension of spring 60 slightly turned clockwise until the side wall of the nose 67 engages the pin 63. Thereafter the latch 66 bears on the nose 67 from the outer face thereof, and it is thereby locked in position. If thereafter the disk 59 is turned by the crank 39 through an angle of 360° the latch 66 slides on the circumference of the said disk until it reaches the cut-out portion of the said disk where, now released from restraint and responsive to the tension of its controlling spring 660, it swings counter-clockwise and bears again from above on the nose 67 for locking the printing mechanism.

The latch 66 is operated from the cancelling mechanism which will now be described.

Before the setting disks 6 can be returned from set to zero position for renewed operation, the value previously set thereby and transmitted to the adding mechanism must be cancelled from the setting mechanism. For this purpose a hand-operated crank 70 is provided which is fixed to a shaft 71 mounted in the right-hand side wall 2 of the casing of the cash register (Fig. 2). A gear wheel 72 secured to the said shaft is in mesh with a gear wheel 73 which is loosely mounted on the shaft 5. A similar gear wheel 73' is mounted on the said shaft 5 at the opposite side of the setting disks 6. To the said gear wheels 73, 73' arms 74 are secured which are connected by a rail 75 passing through the cut-out portions 11 of the setting disks. The rail 75 is adapted for engagement with the radial end walls 76 of the cut-out portions 11 of the setting disks which may have been set, and when the rail 75 is moved clockwise (Fig. 1) it returns the previously set setting disks 6 into initial position, the rotary movement of the said setting disks being limited by abutments in the form of pins 77 borne by the disks and engaging the heels 78 of pawls 79 mounted on a spindle 80 that in turn is mounted in the side walls 2 of the register. The function of the pawl 79 will be described hereafter.

The gear wheels 73, 73' are in mesh with toothed segments 84 fixed to the shaft 80 rotatably mounted in the side walls 2, and to the said shaft a cam disk 86 (Figs. 1 and 15) is secured which is in position for engaging a pin 87 secured to the latch 66. Thus, when the crank 70 is operated for resetting the setting disks the cam 86 rocks the latch 66 against the tension of spring 660 for releasing the disk 59 and the printing mechanism, and the cam disk 86 is located so that it engages the pin 87 upon the latch 66 at the end of the downward or cancelling movement of the crank 70. In a laterally directed lug 90 of the latch 66 a rod 91 is guided which is jointed to a bell crank lever 92 mounted on a rod 93 mounted in the side walls 2, and between the said lug and the bell crank lever 92 a spring 94 is interposed. Thus the latch 66 is yieldingly connected with the bell crank lever 92. To the shaft 93 a pawl lever 95 is secured which is adapted to engage, with a nose formed at its end, with a notch made in a disk 96 secured to the shaft 71. Thus when the pawl lever 95 engages the notch of the said disk 96 it locks the shaft 71 and the crank 70 in position so as to prevent cancelling movement.

In the position of the parts shown in Figs. 1 and 15 the disk 59 and the crank 39 are locked in position by the latch 66, so that printing is impossible. The disk 96 and the crank 70 are not locked by the pawl lever 95. If now the crank 70 is turned anti-clockwise and in the direction of the arrow y shown in Fig. 1 for resetting the setting disks 6, at the end of the movement of the said crank the latch 66 is turned by means of the cam disk 86 in a direction for releasing the disk 59 and the crank 39. By the same movement the pawl lever 95 is turned inwardly through the intermediary of the rod 91 and the bell crank lever 92, and it bears under tension of spring 94 with its nose on the circumference of the disk 96. If thereafter the crank 70 is returned into initial position by a spring 97 the nose of lever 95 slides on the circumference of the turning disk 96 and finally, advancing under the tension of spring 94, it engages in the notch of the said disk, so that the said disk is locked in position and another operation of the crank 70 is impossible.

It appears therefore that the printing mechanism may be operated only after the values which have before been set by means of the setting disks 6 have been cancelled, and that the crank 70 cannot be moved when the latch 66 has swung and remains in its position of release of the printing mechanism. The crank 70 is released by the printing operation when the nose 67 upon the disk 59 turning clockwise releases latch 66 and allows it to turn counter-clockwise under the tension of spring 660. By the counter-clockwise movement thus imparted to the latch 66 the lever 95 is retracted from the disk 96 through the intermediary of the rod 91 and the bell crank lever 92.

Further, on the completion of a rotation through 36°, further rotary movement of the crank 39 is arrested by the engagement of the nose 67 upon the now swung latch 66.

The movement of the setting disks is transmitted through the gear teeth 25, the pinions 26 and the gear wheels 24 to the indicating disks 22, and when the setting disks are reset the said indicating disks are likewise reset.

The setting disks 6a to 6d carry pawls 100 which engage in ratchet disks 101 loosely mounted on the spindle 5. To the said ratchet disks toothed disks 102 are secured which are likewise loosely mounted on the spindle 5. Upon return movement of the setting disks 6 the said disks 101 and 102 are rotated by means of the pawls 100, and they are held in the proper position by means of the aforesaid pawls 79. When the setting disks arrive in their zero positions and the pins 77 thereof engage the heels 78 the said pawls 79 are pressed into the ratchet teeth of the disks 101, so that the disks 102 are locked and overthrowing thereof by rapid operation of the register is impossible.

The toothed disks 102 are in engagement with the adding mechanism shown in Fig. 3 in detail. The said adding mechanism comprises a pair of suitably braced end plates 103. On a spindle 104 fixed to the said end plates toothed disks 105 are loosely mounted which are in mesh with the toothed disks 102, and the said toothed disks 105 are also in mesh with numeral wheels 106 loosely mounted on a shaft 107. To the said numeral wheels ratchet disks 108 are secured which are yieldingly held in their positions by spring-pressed locking pawls 109. On the teeth of the numeral wheels 106 the figures from 1 to 9 and the zero sign are provided, and below the said type wheels there is a printing table 110 which is rockingly mounted on a spindle 111. The said printing table is adapted to be rocked upwardly for printing by means of a hand-operated bell crank lever 112 carrying a roller 113 and a key 114. Thus by means of a strip of paper 115 placed on the table 110 the figures transmitted to the numeral wheels 106 may be printed.

The carrying mechanism for the numeral wheels 106 is constructed as follows: To the numeral wheels carrying disks or single tooth wheels 116 are secured which are adapted, when the corresponding numeral wheel passes from 9 to 0 to engage teeth 117 formed on disks 118 for advancing the same one step, the said disks 118 being held in position by spring-pressed pawls 119 engaging in either one of notches 120 and 121. Each disk 118 has a toothed segment 122 secured thereto which is in mesh with a gear wheel 123, the said gear wheels 123 being suitably supported on plates 215 (Fig. 17) passed between the consecutive disks 118. The gear wheels 123 are in mesh with teeth formed on arms 124, and on the said arms pawls 125 are mounted which are in engagement with the aforesaid ratchet wheels 108, it being understood that a disk 118 controlled by a numeral wheel 106 of one order controls the ratchet disk 108 of the numeral wheel of the next higher order, as is known in the art. The connection of the different gear wheels is such that the pawl 125 rides anti-clockwise (Fig. 3) on its ratchet disk 108 when the numeral wheel of the next lower order passes from 9 to 0, and it is returned in clockwise direction for advancing its numeral wheel one step at the end of the operation of the numeral wheels by the toothed disks 105. For this purpose the following mechanism is provided: In the end plates 103 a shaft 130 is rotatably mounted which is connected by a gear wheel 131 and the aforesaid gear wheel 54 with the shaft 37 of the printing mechanism. To the shaft 130 cams 132 are secured one for each of the orders of the adding mechanism, except the first one, the said cams being displaced accordingly axially of the shaft 130. The said cams are also displaced relatively to one another circumferentially of the shaft 130, so that they are successively made operative when the shaft 130 is rotated from the crank 39. The toothed segments 122 are provided each with an arm 133 located in the path of one of the cams 132. Therefore by the operations of the printing mechanism by means of the crank 39 the toothed segments 122, the gear wheels 123 the arms 124 and the pawls 125 are operated for advancing the carrying disks 110 one step, and the said operation is successive in the successive orders of the adding mechanism.

From the description of the carrying mechanism it will be understood that the carrying operations in the successive orders do not interfere with one another, and further they do not interfere with the adding operation imparted to the numeral wheels by the disks 106.

On the shaft 107 on which the numeral wheels 106 are mounted a device for printing consecutive numbers is mounted. Such devices are known in the art, and I deem it not necessary to describe the same in detail. It is operated from the crank 59 of the printing mechanism through the intermediary of a cam 135 fixed to the shaft 130, and a lever 136 formed with a bifurcated end engaging a pin 137 of an arm 138. On said arm a pawl 139 is mounted which is in mesh with the said printing device. A cam 140 secured to the shaft 37 acts on a roller 141 (Fig. 1) carried by a bell crank lever 142 which is connected by a link 143 with an arm 144 pivotally mounted on the shaft 16 and carrying a pawl engaging the aforesaid type disks 17 by means of which consecutive numbers are printed on the voucher and the record strip. Thus the number printing device 17 and that provided in the adding apparatus are simultaneously operated, so that the numbers are the same in both devices. Therefore the adding device prints the number which is printed on the voucher and the record strip, and it indicates the total in the register, which facilitates checking.

A balance statement taken by printing from the adding mechanism is illustrated by way of example in Fig. 4. In this case, the lower sum was printed at sale No. 273, at the commencement of a period of service, and the upper sum at sale No. 495 at the end of a period of service. The difference between these two sums therefore represents the takings in the register.

In Figs. 1, 5, and 15 the parts of the machine have been shown in their positions at the end of the printing operation. The latch 66 engages the nose 67 and locks the printing mechanism, and the latches 13 lock the setting disks 6 in position to prevent resetting thereof. Further, pawls 145 are mounted on the spindle 12 which likewise engage in the notches 14 and prevent setting movement of the setting disks. If it is desired to enter a new item into the cash register the previously made item must first be cancelled by means of the crank 70, and in this operation the latches 13 are retracted from the setting disks. This is done by means of a pair of disks 146 which are fixed to the gear wheels 73, 73' and which are formed with notches 147 engaged by arms 148 pivotally mounted on the spindle 12. A rod 149 secured to the arms 148 bears on heels 150 of the latches 13. If the crank 70 is turned in the direction of the arrow y (Figs. 1 and 15) the disks 146 rotate in the direction of the arrow z shown in Fig. 5, and thereby the arms 148 are rocked into the position shown in Fig. 5 in dashes and dots, whereby the rod 149 retracts the latches 13 from the notches 14.

Further, it is necessary to retract the pawls 145 from the notches 14 of the disks 6, to permit the said disks to be set after the cancelling operation. Normally the said pawls are yieldingly pressed into the notches 14 by springs 151 secured thereto and bearing on a rod 152 carried by a pair of levers 153. At the end of the downward movement of the crank 70, and after the disks 6 have been reset in zero position the pawls 145 are retracted from the notches 14 by means of a rod 154 carried by the levers 153 and engaging noses 155 of the pawls, the said rod 154 being connected with the latch 66 by a link 156 (Fig. 15). It appears therefore that the pawls 145 are retracted for releasing the disks 6 at the end of the forward stroke of the crank 70 and when the printing mechanism is released. Therefore the setting disks 6 which are now released from the latches 13 and the pawls 145 might be freely moved upwardly and downwardly without requiring a printing operation. Therefore it would be possible to transmit values to the adding mechanism which are not recorded by the printing operation. For this reason it is necessary for the present to lock the disks 6 in position, and for this purpose pawls 158 are provided which are thrown into locking engagement with the disks 6 before the said disks have been released from the pawls 145. The said pawls 158 are loosely mounted on the spindle 12, and they are acted upon by leaf-springs 159 fixed to the heels 150 and bearing on pins 160 carried by the pawls 158. As has been described above the latch 13 is retracted from the notches 14 at the beginning of the cancelling operation, and therefore the pawls 158 are thrown into locking engagement with the said notches before the pawls 145 are retracted. Thus setting movement of the disks 6 is impossible, while they may be reset (that is returned to zero position) by reason of the springs 159 holding the pawls 158 in yielding engagement with the notches 14. At the end of the cancelling operation and when the released crank 70 has returned under spring tension to initial position, the arms 148 come again into engagement with the notches of the disk 146, so that the spring-impelled pawls 13 swing clockwise into the notches 14, and the pawls 158 are retracted by means of pins 161 carried thereby and borne upon by the bases of the springs 159 that are carried in the heels 150 of the pawls 13. If now the setting disks 6 are again set for entering the new value into the register, they cannot be returned into initial position because they are locked by the latches 13. Further, the cancelling crank 70 cannot be operated any more because at the end of the cancelling movement the latch 66 has been turned clockwise by means of the cam 86 and the pawl lever 95 has been brought into locking engagement with the disk 96. Therefore now the printing mechanism must be operated by means of its crank 59. During this operation the latch 66 slides on the nose 67 upon disk 59. When the nose 67 passes beyond engagement with the latch the latch 66 turns under the tension spring 66G' in counter-clockwise direction, shifts the link 156 to the left (Figs. 5 and 15), and permits the pawls 145 to be again thrown into locking engagement with the setting disks by the springs 151.

In order to avoid errors in checking or supervision, which are readily caused by the special entries at the withdrawal of cash, the following arrangement is also provided:

Hitherto upon the withdrawal of sums from the register, it has been usual to print a voucher with a special indication such as "Credit" which enabled it to be recognized as an account and not as a receipt. The same indication appeared also upon the record strip. Now, in order to circumvent the checking, it is possible without any particular trouble so to alter the indication upon a voucher that it can be used as a receipt for a payment. Also, at the checking, the indication may easily be overlooked, especially due to illegible printing, so that incorrect reckoning may be caused in this way. To avoid this defact, in the present arrangement, the strips to be printed are displaced laterally in relation to the type when the register is set for "Credit" or "Withdrawal", so that sums withdrawn are printed out of the column of the sums paid in and consequently their inclusion by mistake in the addition upon checking is rendered impossible. Also, in the free space upon the voucher produced by the displacement, the word "Invalid" may then be printed as an additional indication.

In the arrangement employed for this purpose, the supply reels 33 and 40 (Figs. 1 and 2) for the voucher and record strips, the drum 44 and associated parts, and the hammer 16 and its lever 51, are mounted in a carriage 165 consisting of a sheet metal plate bent into U-shape and running upon rollers 166. The side cheeks of the carriage are formed with cut-out portions 16' for the passage of the hammer 16 therethrough. Rigidly connected to the carriage is a projection 167 (Fig. 2) having a notch in which engages a finger 168. This finger is secured upon a shaft 169 mounted in the frame of the register and is pressed into the notch in the projection 167 by a spring 170 disposed on said shaft. In this manner the carriage which is subject to the pressure of a spring 171, is normally held in the position illustrated. The setting disk 6e (Fig. 2) is used for effecting the credit-setting and it is marked with an indication of its purpose. It carries a pawl 172 which, when the credit-setting is effected, encounters a lever 173 fast upon the shaft 169. By this means the shaft 169 is turned until the finger 168 is lifted out of the notch in the projection 167, to permit the carriage 165 to be shifted against a stop 175 by the spring 171. The carriage 165 carries a resilient hammer 176 which, upon the shifting of said carriage, strikes a bell 177 and thereby draws the attention of the person in charge to the special nature of the register operation. For this purpose, use may also be made of any other suitable tally or indicating device instead of the bell 177. Owing to the displacement of the paper strips 29, 41 produced by the carriage movement, the subsequent printing is effected at a different point from that of the sums paid in. The spaces thus left free may be printed by an auxiliary printing block 178 (Fig. 2) in any conspicuous manner (see Figs. 7 and 10).

Fast upon the shaft 80 (Figs. 1 and 2), which is rotated by the cancelling handle 70, is an arm 180 to which is pivoted a link 181 connected to a lever 182 by means of a Hocker's-joint 183. The lever 182 engages with a yoke 184 fixed to the carriage 165 and, upon the cancelling operation, returns the carriage to its normal position in which it is re-locked by the finger 168. In the normal operation of the register, i. e. for the registration of sums paid in, the lever 182 swings idly in the free space in the yoke 184.

The adding mechanism (Fig. 1) is mounted to swing about the shaft 37 and is secured in the operative position by a trigger-lever 187 which is pivoted on the register frame and engages behind a lug 188 on said adding mechanism. When, upon the setting of the special disk 6e the pawl 172 (Fig. 1) encounters the lever 173, a pin 189 on this setting disk strikes the trigger lever 187 and disengages the same so that the adding mechanism falls back against a stop 190 and becomes disengaged by the separation of the meshing parts 102, 105. Consequently this particular register operation is not recorded in the adding mechanism. Only upon the operation of the cancelling handle 70 is the adding mechanism then returned subsequently to the position of engagement. This may be effected by hand.

The arrangement described for disconnecting the adding mechanism has the further advantage that by the use of the aforesaid special disk 6e settings of the disks 6 can, before printing, be retracted and made ineffective. The following auxiliary means serve this purpose:

A pin 191 provided on the adding mechanism (Fig. 1) slides in a longitudinal slot in a link 192 which is pivoted to one arm of the double-armed lever 92. If the setting disks 6 have been set, then, as previously explained, the cancelling handle 70 is locked by the locking lever 95. The link 192 is then in such a position that the pin 191 lies at the outer end of its longitudinal slot, i. e. at the opposite end to that illustrated, so that, upon the falling out of the adding mechanism, the link 192 is carried along by the pin 191 and the lever 92 is turned clockwise. The resultant turning of the shaft 93 and locking lever 95 releases the lock upon the cancelling handle 70. An erroneous setting of the disks 6 can therefore be cancelled without a record being made in the disengaged adding mechanism.

The register is adapted for the issue not only of a voucher representing a single sale, but also of vouchers of the kind shown in Fig. 9, in which any desired number of individual sales are recorded one under the other ready for addition. Such a voucher permits of precise checking of the individual sales. As illustrated in Figs. 11 to 14, one of the feed rollers, the roller 35, 36, is a two-part roller. The roller part 35 is fast upon the shaft 37 and, during one turn of the handle 39, this roller part 35 bears against the co-operating feed roller 34 with a part only of its periphery (Fig. 11), i. e. transiently only, and thus advances the voucher strip 29, lying between the members, by a short distance corresponding to the depth of the single printed line already printed. Slidably mounted upon the shaft 37 is the second roller part 36 provided at its periphery with a projecting part (Fig. 11) which is itself a printing block. This serves to advance the voucher strip 29 by the depth of the printing block and at the same time to print it with an additional inscription, such for example as the title of the firm.

This roller part 36 is normally coupled, under the action of a spring 195, with the part 35 by coupling pins 196, so that, upon turning the handle 39, the voucher strip 29 is first advanced by the part 35 through approximately the depth of one printed line and then by the part 36 through the distance necessary for the additional inscription.

Supported in the hollow shaft 37 there is a rod 198 which is provided at its outer projecting end with a knob 197. Attached to this rod is a pin 199 (Fig. 14) which projects, through a longitudinal slot in the shaft 37, in front of the axially shiftable roller part 36. Pressing in of the knob 197 results in the part 36 being slid off from the coupling pins 196 and coupled with the frame of the register by a pin 200 mounted thereon. The part 36 is thus prevented from rotating (Fig. 14). The depressed knob 197 is secured against return by a spring-driven bolt 201 which engages in a notch 202 in said knob. If, after the disconnection and locking of the part 36, the handle 39 is rotated, the voucher strip 29 is then advanced by the roller part 36 alone i. e. only through the distance required for one printed line, so that with a series of entries a voucher is produced wherein the individual sums are set out ready for addition, that is closely one below another (Fig. 9).

Only at or after the printing of the last sum paid, is the bolt 201 removed from the notch 202 by drawing down a pin 203, so that the knob 197 is moved out again and the roller part 36 is returned by the spring 195 to its initial position wherein it is coupled with the part 35 by the pins 196. Consequently upon rotating the handle 39 the printing block of the part 36 is effective for printing and feeding the voucher strip.

The printed voucher is cut off by the knife 30 (Fig. 1) which is operated manually by depressing a lever 204 (Fig. 6). To prevent this knife being used in error prematurely, i. e. before the passage thereunder of the last printed line, the following locking arrangement is provided:

Upon pressing in the knob 197, a lever 205, which swings about a pivot 206 (Fig. 12) and is subject to the action of a spring 207, is turned by the action of a cone 208 into the position indicated in dashes and dots (Fig. 12). In this position the lever 205 is locked by a latch 209 engaging behind a pin 210 mounted on said lever. Pivoted to the lower end of the lever 205 is a bolt-bar 211 which is moved under the knife lever 204 (Fig. 12) by the swinging movement of the lever 205 and so prevents said knife lever from being depressed. When the knob 197 is permitted to move out again and the roller part 36 is recoupled with the part 35, the lever 205 could also swing back again were it not temporarily retained by the latch 209. This latch is only released, upon the turning of the handle 39 itself, by the striking against it of a lug 212 carried on the shaft 37. Consequently, to unlock the knife lever 204, it is necessary first to rotate the handle 39 together with the re-coupled roller part 36 which advances the voucher so far that the last printed line passes beyond the knife 30.

The lever 205 (Figs. 12 to 14) bears on the cone 208 through a slot in the shaft 37, is pressed aside, upon turning of said shaft, by the boundary wall 213 (Fig. 12) of the slot and is held in this position until the completion of the rotation of the printing handle 39. Consequently the knife lever 204 is held locked during rotation of the handle 39 and can only be released when, upon the completion of such rotation, the lever 205 re-enters the slot and bears on the cone 208.

I claim:

1. In a cash register, the combination, with setting disks, cancelling mechanism therefor, and printing mechanism including an operating device, of means for locking said printing mechanism in withdrawn and inactive position, means controlled by said cancelling mechanism for throwing said locking means out of locking engagement with said printing mechanism and locking the same in the position out of locking engagement, locking mechanism for said setting disks comprising a set of spring-backed latches adapted to prevent resetting of said disks and two sets of pawls adapted to prevent setting movement of said disks, a connection between said locking means and the first one of said sets of pawls adapted to throw said pawls out of locking engagement with said setting disks when said locking means are set into releasing position, connections between said cancelling mechanism and said sets of latches adapted at the beginning of the operation of said cancelling mechanism to throw said latches out of locking engagement and further adapted at the end of the operation of said cancelling mechanism to release said latches and connections between said set of latches and said second set of pawls whereby the movement of the latches to unlocking position effects the movement of the pawls to locking position and movement of the latches to locking position effects movement of the pawls to releasing position.

2. In a cash register, recording and totaling mechanism including a plurality of setting disks severally and independently rotatable upon a common axis and capable of being rotated from inactive to one or another particular setting position and back again to inactive position, a plurality of numeral wheels corresponding in number to the setting disks, and severally rotatable upon a common axis, means including a pair of gear wheels relatively movable into and out of mesh for rotating each numeral wheel in response to retrograde turning of one of said setting disks, an arm movable from inactive to active position in response to a complete rotation of one of said numeral wheels, means responsive to the return movement of said arm from active to inactive position for advancing another of said numeral wheels through a fraction of one rotation, a movable member adapted in the range of its advance to engage such arm when in active position and to return it to inactive position, and a spring-backed latch for said last-named means movable from release to locking position in the advance of the said means, means for simultaneously returning the setting disks to inactive position and shifting the spring-backed latch last named to release position, a latch for the said disk-returning means movable between inactive and active positions, said latch for the disk returning means being subject to the latch for the said member-advancing means and movable to inoperative position in response to movement of the last-named latch to operative position and to operative position in response to movement of the last-named latch to inoperative position.

3. In a cash register the combination with setting disks and cancelling mechanism therefor and printing member and an operating device therefor, of a control for the operating device of the said printing member, such control including two disks mounted for rotation upon a common axis, rotatable independently through a limited range of turning and beyond such range rotating in unison, a cam movable in accord with the turning of one of said disks and adapted in the range of movement alternately to hold in restraint and to release the operating device of said printing member, the other disk being a cam disk, a spring tending to rotate the other disk relatively to the first in the direction of device-releasing rotation of the first, and a spring-impelled latch normally engaged by the second disk of the control mechanism and holding the control mechanism in device-restraining position, said latch being movable to control-releasing position in response to operation of said cancelling mechanism, the second disk of said control mechanism movable under spring tension on the swinging to release position of the said latch to a position of restraint of the said latch when the said latch is in its release position.

4. The structure of claim 3 together with locking means for said canceling mechanism, such locking means being subject to the swinging of the latch, whereby the locking means moves to locking position in response to the movement of the latch to control-releasing position.

5. In a cash register, a rotatably mounted setting disk adapted to be advanced manually from inactive position to one or another successive operative positions and to be returned to inactive position again, said disk being equipped with a succession of type faces, and with a succession of ratchet teeth, a pawl adapted to be shifted to and from a position of engagement with one or another of the teeth of said ratchet and by such engagement to prevent advance of said disk, a printing member adapted to cooperate with the type face of said disk when advanced to an operative position, an operative device for said printing member, a manually movable control normally engaging said printing member and holding its operative device in retracted position, a spring-backed latch normally locking said control, a spring-backed rotary member adapted to be advanced manually from inactive position and to be returned under the tension of its backing spring to inactive position again, and adapted in its advance to return the said disk from operative to inactive position, the said pawl and the said latch being responsive to the advance movement of said rotary member and movable thereby, both of them to positions of release.

6. In a cash register a disk mounted for rotation from inactive position to one or another of a succession of active positions and back to inactive position again, said disk being equipped with a succession of type faces and a corresponding succession of ratchet teeth, a spring-backed pawl adapted to engage said teeth and by such engagement to prevent backward turning of said disk, a second spring-backed pawl adapted to engage said ratchet teeth and by such engagement to prevent forward turning of said disk, a third pawl movable to and from engagement with said teeth and by such engagement to prevent forward turning of said disk, a printing member adapted to cooperate with a type face of the disk when in active position, an operative device for said printing member, a manually movable control normally engaging said printing member and holding it in inactive position, a spring-backed latch for said control held normally in inactive position by said control when said control is in normal position but released on movement of said control and movable under spring tension to locking position, a spring-backed rotary member adapted to be advanced manually from inactive position and to be returned under the tension of its spring backing to inactive position again, means movable in response to the advance of said rotary member and adapted to swing the first-named pawl and to retain it in retracted and inactive position so long as the rotary member itself is in advanced position, means movable in response to the advance of said rotary member for engaging said disk when in active position and returning it to inactive position again, means movable in response to the advance of said rotary member for shifting the latch for said control from active to inactive position, said control being equipped with means movable to latch-retaining position on the swinging of said latch to inactive position, and a latch for said rotary member movable in response to movement of the latch for the said control and movable to release position when the latch for the control moves to locking position and movable to locking position when the latch for the control moves to release position.

7. In a cash register, a rotatably mounted setting disk adapted to be advanced manually from inactive position, said disk being equipped with a succession of ratchet teeth and with a succession of type faces, a spring-backed pawl adapted to cooperate with said ratchet teeth and hold the disk from retrogression when in one or another particular position in the range of its advance, a printing member adapted to cooperate with the type faces of the disk brought by the advance of the disk to cooperative position, an operative device for said printing member, a manually movable control, normally engaging said printing member and holding it in retracted position, a spring-backed latch for said control, a spring-backed rotary member adapted to be advanced manually from inactive position and to be returned under the tension of its spring backing to inactive position again, means movable in response to the advance of said rotary member and adapted to retract said pawl and to retain it in retracted position while said rotary member is in advanced position, said spring-backed rotary member adapted to engage the setting disk when in advanced position and to return it to inactive position, a second spring-backed latch adapted to lock the said rotary member in inactive position, said latch being movable to release position in response to movement of the first-named latch to locking position, and to locking position in response to movement of the first-named latch to release position, and means responsive to the return of the said rotary member from active to inactive position for shifting the first named latch to release position.

8. In a cash register the combination, with a plurality of setting disks severally rotatable upon a common axis and equipped each with a succession of type faces and adapted to be advanced severally from a position of inaction to one or another of successive positions of operation, a corresponding plurality of numeral wheels severally rotatable upon a common axis with means for rotating each in response to the retrograde turning of one of said setting disks and through a range of turning corresponding to the range of turning of the setting disk, and a movable printing member and means for driving the printing member toward a type face of a setting disk when the disk is in a position of operation, of an arm movable from inactive to active position in response to a complete rotation of one of said numeral wheels and means for turning another of said numeral wheels through a fraction of a rotation in response to movement of said arm from active to inactive position again, a movable control member normally holding in restraint the driving means of said printing member, and means for simultaneously moving said control member from such normal position and shifting said arm from active to inactive position.

FRITZ ELLER.